Sept. 15, 1925.
S. W. PARSONS
SEAL FOR METAL STRAPS
Filed July 24, 1924
1,553,791
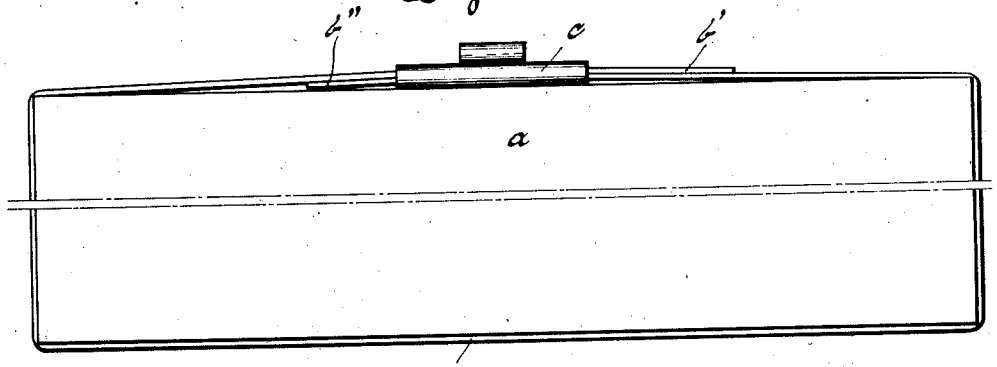
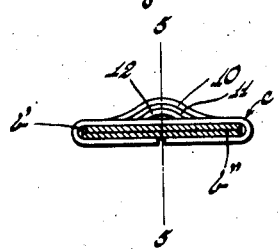
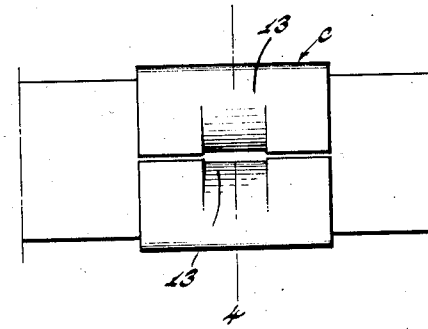
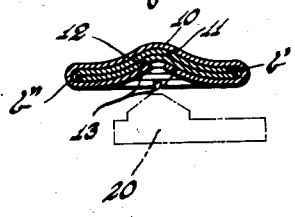
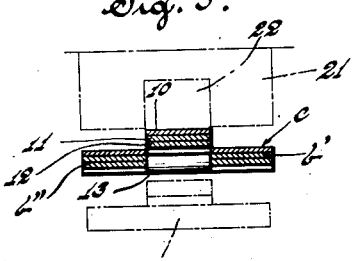
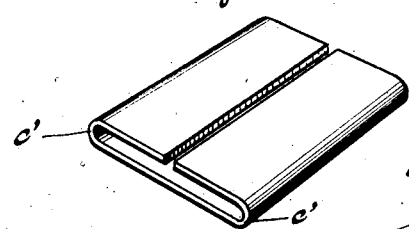
Inventor
Stuart W. Parsons
By T. Clay Lindsey
His Attorney Patented Sept. 15, 1925.

1,553,791

UNITED STATES PATENT OFFICE.

STUART W. PARSONS, OF NEW BRITAIN, CONNECTICUT, ASSIGNOR TO THE STANLEY WORKS, OF NEW BRITAIN, CONNECTICUT, A CORPORATION OF CONNECTICUT.

SEAL FOR METAL STRAPS.

Application filed July 24, 1924. Serial No. 727,942.

*To all whom it may concern:*

Be it known that I, STUART W. PARSONS, a citizen of the United States, and a resident of New Britain, county of Hartford, State of Connecticut, have invented certain new and useful Improvements in Seals for Metal Straps, of which the following is a specification.

This invention relates to a seal for securing together the ends of a flat metal strap, or straps, such, for instance, as are applied to shipping boxes.

The aim of the invention is to provide a seal of this sort having various features of novelty and advantage, and which is particularly characterized by its extreme simplicity in construction, its economy in manufacture, the ease and facility with which it may be applied, and by its strength and the security with which it holds the ends of the strap together. A further object is to provide very simple, cheap and effective seals of this sort which also constitute domes or casters which protect the straps and permit the box or article to which they are applied to be readily slid over a surface.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawings, wherein I have shown, for illustrative purposes, one embodiment which the present invention may take:

Figure 1 is a view showing, more or less diagrammatically, a packing box with a metal strap therearound and my improved seal for securing together the overlapping ends of the strap, the seal being in side edge elevation and its size, relative to the box, being slightly exaggerated for the purpose of illustration;

Fig. 2 is a transverse section through the overlapping ends of the strap and shows the sealing member in end elevation;

Fig. 3 is a bottom plan view of the seal;

Fig. 4 is a transverse section taken on line 4—4 of Fig. 3;

Fig. 5 is a longitudinal section taken on line 5—5 of Fig. 2; and

Fig. 6 is a perspective view of the sealing member in inverted position and before it is applied to the strap.

Referring to the drawings in detail, $a$ designates a box which may be of any suitable construction; $b$, the flat, thin metal strip with which the box is bound; and $c$, the sealing member securing together the overlapping ends of the strap and which ends are respectively designated by $b'$ and $b''$.

The sealing member $c$, before it is secured in place, comprises, as shown most clearly in Fig. 6, a relatively short flat tube split longitudinally on the medial line of its bottom wall. This member is preferably formed from a relatively thin flat strip of metal by cutting from the strip a piece of the desired length and then bending or folding over the side portions thereof towards each other. By preference, the side edges $c'$ of the sealing member are rounded or curved so as to avoid sharp corners, and the opening in this member is of such size that the member may be readily slipped over the overlapping ends of the strap.

To secure the strap in position on the box, the strap is placed around the box and the sealing member is moved to a position where it surrounds the overlapping ends $b'$ and $b''$ of the strap. The bottom and top walls of the sealing member and the portions of the strap therebetween are then correspondingly slotted transversely, preferably along parallel lines, and the metal of the top and bottom walls of the sealing member and of the strap ends between the slots is then forced upwardly forming transverse bridges. The bridge in the upper wall of the sealing member is indicated by the numeral 10; the bridge of the overlying strap end, 11; and the bridge of the underlying strap end, 12. These three bridges are each continuous or unbroken. The bridge in the bottom wall of the sealing member is in the form of two tabs or fingers 13, these being so formed because the bottom wall of the sealing member is longitudinally divided. In forming the bridges, the metal constituting the bridges, and also the metal of the strap ends and the sealing member to each side of the bridges, is very closely pressed together so that, in a sense, they bind against each other. It will be seen, and particularly from Figs. 2, 4 and 5, that each of the bridges, excepting the bridge 10, intersects the plane of one or more thicknesses or layers of metal, that is to say, the fingers 13 extend across the planes of the overlapping strap ends and the top wall of the sealing member, the bridge 12 of the underlying strap end extends across the planes of the overlying strap end and the upper wall of the sealing member, and the bridge 11 of the overlying strap end extends across the plane of the upper wall of the sealing member: thus, the three lower bridges 11, 12 and 13 form locks, so to speak, which extend through openings in the overlying thicknesses of metal. The side edges of the slots in the upper three layers of the metal constitute flat abutments disposed at right angles to the length of the straps, and against these abutments engage one or more of the side edges provided by the bridges in the bottom of the sealing member and the two strap ends. I have found that, although the strap ends are slotted to form the bridges, nevertheless, the portions of the strap ends within the sealing member are substantially as strong as the strap outside of the sealing member, that is to say, under excessive strains, it is just as likely that the strap will break at a point out of the sealing member as at a point within the same. This is probably due to the fact that the metal of the bridges and the metal to either side of the bridges is closely pressed together so that the positive lock provided by the bridges is supplemented with a frictional and binding engagement of the contacting surface under pressure. The bridges 10 extend above the sealing members and straps and act in the nature of casters or domes which permit the boxes to be readily slid over one another or over a floor without damage to the straps.

The sealing operation may be performed by any suitable machine, but, by way of illustration, I have shown, in Figs. 3 and 4, a pair of dies for this purpose. 20 indicates a male die and 21, a female die having a groove 22 of substantially the same width as the width of the male die. In side elevation, the male die tapers towards its central portion, as will be seen from Fig. 3. After the sealing member has been slipped to proper place, the two dies are brought together, whereupon all four plies of the metal will be slit, and the portions between the slit forced upwardly to form bridges, as heretofore described.

I claim as my invention:

1. A seal for box straps and the like comprising overlapping strap portions of thin metal, and a flat tubular member of thin metal surrounding said strap portions, each of said strap portions and the top and bottom walls of said sealing member having formed between their side edges superimposed, transversely-extending, raised bridges, said bridges and the metal of the strap portions and member at each side thereof being in close contact, the bridges in the top wall of said sealing member and said strap portions being unbroken and continuous through their lengths, and each being connected throughout their widths to the respective element in which it is formed.

2. A seal for box straps and the like comprising overlapping strap portions of thin metal, and a flat tubular member of thin metal surrounding said strap portions and having its bottom wall divided on its longitudinal medial line, said strap portions and the top wall of said member having intermediate their side edges transversely-extending, raised superimposed and continuous bridges, the bottom wall of said member having a bridge comprising two tabs or fingers bent upwardly, substantially as described.

STUART W. PARSONS.